United States Patent [19]

Schneider et al.

[11] Patent Number: 5,017,089

[45] Date of Patent: May 21, 1991

[54] PROPELLER SPEED GOVERNOR HAVING A DERIVATIVE INHIBIT AT HIGH FLIGHT SPEEDS

[75] Inventors: Roy W. Schneider, Ellington; Eugenio DiValentin, Enfield, both of Conn.

[73] Assignee: United Technologies Corporation, Hartford, Conn.

[21] Appl. No.: 336,273

[22] Filed: Apr. 11, 1989

[51] Int. Cl.⁵ .............................. B63H 3/00; B64C 3/18
[52] U.S. Cl. .................................... 416/35; 244/76 B; 415/17
[58] Field of Search ................ 416/35, 44, 38; 415/17; 417/42; 244/76 B

[56] References Cited

U.S. PATENT DOCUMENTS 2,849,072  8/1958  Brahm ................................. 416/35
3,493,826  2/1970  Wandrey ......................... 318/621 X Primary Examiner—William E. Wayner
Attorney, Agent, or Firm—Ronald R. Snider

[57] ABSTRACT

A propeller speed governor having a derivative feedback of propeller speed and having a means such as a switch to open the derivative feed back loop when airspeed exceeds a predetermined amount is shown and described. This derivative inhibit is used to provide improved dynamic compensation at high and low speeds.

5 Claims, 1 Drawing Sheet

PROPELLER SPEED GOVERNOR HAVING A DERIVATIVE INHIBIT AT HIGH FLIGHT SPEEDS

TECHNICAL FIELD

This invention relates to control of aircraft propeller pitch and propeller speed at high flight speeds. This invention is used with a propeller speed control which governs propeller speed during flight by controlling propeller pitch.

BACKGROUND ART

It is known in the prior art to govern propeller speed by controlling propeller pitch. It is also known to provide dynamic compensation for the propeller speed control which is a function of the propeller speed passed through a lead network. There is however no lead compensation which provides near optimum governor dynamic compensation at both low and high flight speeds.

FIG. 1 illustrates the prior art governor and the improved governor in accordance with this invention. The typical prior art governor consists of an integrator 11 acting on propeller pitch, the propeller and propeller inertia 12. Since the control variable is propeller speed at the output of 12, this term is also fed back to the input at summing junctions 13 and 14. It is also known to incorporate the speed derivative feedback in the propeller electronic SYNCHROPHASER ® which provides a lead compensation in the propeller speed governing loop. This lead compensates for the combined inertia lag of the propeller and power turbine.

Electronic hardware constraints often require that a constant value of the lead time constant (K2), FIG. 1, be used at all operating conditions. It is known that the inertia lag time constant at high flight speeds is much smaller than the time constant at low flight speeds. Selection of the time constant for lead compensation must therefore be compromised to a smaller time constant value for high flight speed stability than the optimal which would be selected for good low flight speed governing characteristics. This results in less than optimum lead compensation during low flight speeds.

DISCLOSURE OF THE INVENTION

This invention is the placement of a switch 19 in the derivative feedback path of a propeller speed control. The switch is used to inhibit the derivative feedback when it is no desired and/or not required. The derivative inhibit switch is controlled by logic which turns the switch off when a predetermined airspeed is reached.

This invention is directed to the problem of dynamic compensation when the propeller pitch is used to govern propeller speed. Ideally, the dynamic compensation should be varied in value in accordance with flight conditions and engine power.

Present-day control hardware constraints usually require that the dynamic compensation be a constant value at all operating conditions. The choice of the constant value of dynamic compensation must therefore be a compromise. This compromise yields degraded governing stability at some operating conditions.

The foregoing and other objects, features and advantages of the present invention will become more apparent in the light of the foregoing detailed description of the preferred embodiments thereof as illustrated in the accompanying drawing(s).

DESCRIPTION OF THE PREFERRED EMBODIMENT

This invention inhibits the speed derivative at high flight speeds. In the prior art, dynamic compensation is usually provided by a speed derivative feedback such as that shown in FIG. 1. The derivative feedback is provided by the block 10 which provides a leading component in the feedback to the governor.

A method and apparatus is disclosed for improving the dynamic compensation and time constant match at low flight speeds by deleting the speed derivative path at high speeds. The dynamic compensation is deleted in the portion of the flight envelope where it is not needed. This speed derivative inhibit deletes the dynamic compensation at high flight speeds where it is not needed. When the speed derivative is deleted at high flight speeds, it also becomes possible to increase the derivative feedback at low flight speeds, and therefore provide even better governor dynamic compensation in the low flight speed region.

Figure 1:
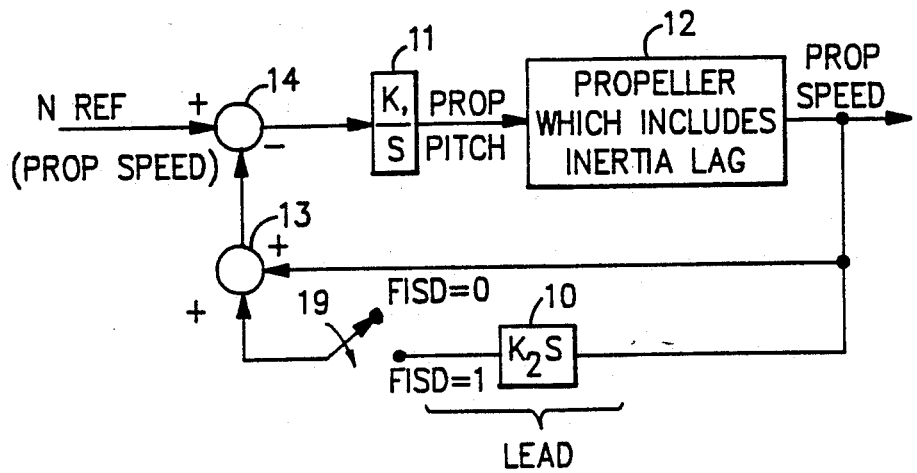
FIG. 1 shows a typical propeller speed governor of the prior art and a speed inhibit means 19 in accordance with this invention.

A constant indicated airspeed (KAIS) has an approximate constant value of the inertia lag time constant in a control in accordance with FIG. 1. Therefore, a constant value of indicated air speed (KIAS) can be selected which defines the limits above which the dynamic compensation is not required and can be deleted. Deleting the propeller governing dynamic compensation from this portion of the flight envelope permits the lead time constant (K2) block 10, FIG. 1, to be increased so that the dynamic compensation is closer to the optimum value at the lower flight speeds.

Deleting the speed derivative path by switch 19 (block 10) is only one method for inhibiting the governing dynamic compensation. Other methods which may be employed include a switch in the lead feedback path, a disconnect in the lead feedback path, a change of the constant K2 to zero, a removal of power from the leading feedback path, or other methods for inhibiting the dynamic compensation.

Figure 2:
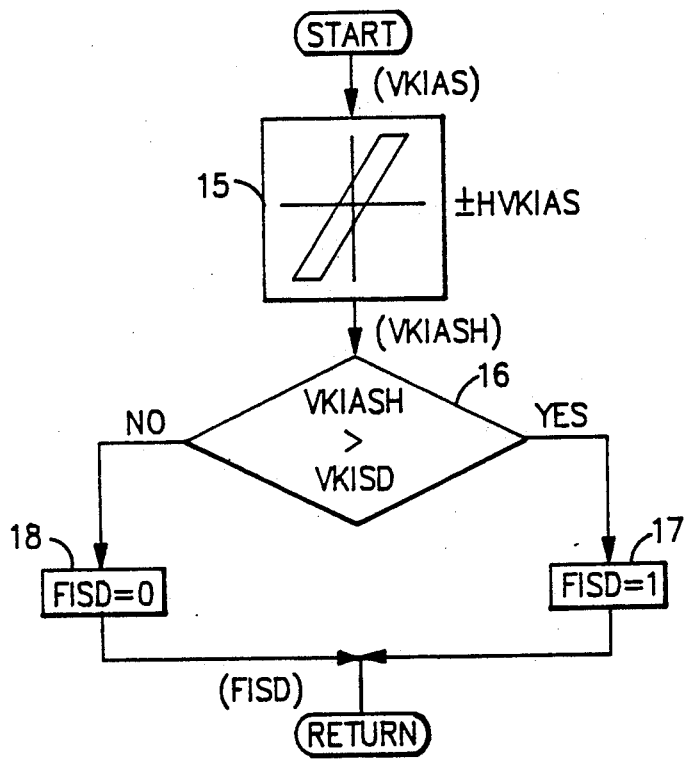
FIG. 2 is a logic flow diagram for the speed derivative inhibit logic.

In FIG. 2 there is shown the control logic for generating a signal, FISD=0, or FISD=1 which provides a derivative inhibit command for the leading feedback control loop. In this embodiment, the dynamic compensation of the propeller pitch governor is improved by inhibiting the speed derivative path in the propeller speed control at flight speeds where compensation is not needed or desirable. Inhibit is accomplished by turning off switch 19.

Figure 3:
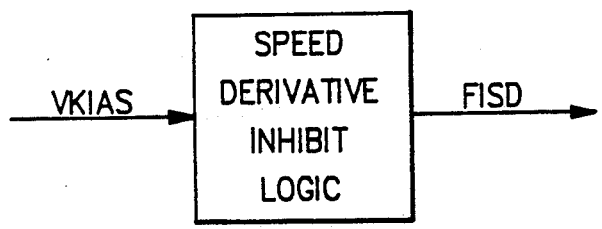
FIG. 3 shows the speed derivative inhibit in accordance with this invention.

FIG. 3 shows a block diagram general description of the method for computing the inhibit command signal (FISD). This block diagram shows that sensed indicated airspeed (VKIAS) is used in the speed derivative inhibit logic to compute FISD. The output FISD is used to control switch 19 of FIG. 1. The speed derivative inhibit logic block in FIG. 3 is described in detail in FIG. 2. Referring to FIG. 2, the sensed indicated air speed VKIAS is passed through a hysteresis band HVKIAS (15) to yield an air speed signal VKIASH. A indicated air speed signal (VKIASH) in excess of a constant value VKISD (block 16) will command the speed derivative inhibit FISD=1 (block 17). Also, if VKIASH is less than VKISD, the speed derivative inhibit command will be zero. FISD=0 (block 18).

The hysteresis band, HVKIAS (block 15). prevents the inhibit signal FISD from continuously cycling between 0 and 1 when the indicated air speed VKIAS is near VKISD, the predetermined constant indicated air speed value.

Referring now to FIG. 1, switch 19 provides feedback from block 10 when FISD=1 and no feedback when FISD=0.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

We claim:

1. Apparatus for governing the speed of a propeller by changing propeller blade pitch, comprising:
   speed integrator means, for providing a signal indicative of desired blade pitch, said blade pitch signal comprising an integration of a propeller speed signal;
   feedback means, responsive to said propeller speed signal, for providing a predetermined lead compensation to said speed integrator means, said predetermined lead compensation comprising a derivative of said propeller speed signal; and
   control means, responsive to an air speed signal indicative of actual air speed, for inhibiting said feedback means above a predetermined air speed from being provided to said speed integrator means, and having a hysteresis band through which said air speed signal passes, whereby the value of said predetermined lead compensation is greater than the value which would cause governing instability above said predetermined air speed.

2. Apparatus according to claim 1 wherein said control means comprises:
   a switch; and
   switch logic means for actuating said switch above said predetermined air speed.

3. Apparatus for governing the speed of a propeller by changing propeller blade pitch, comprising:
   speed integrator means, for providing a signal indicative of desired blade pitch, said signal comprising an integration of a propeller speed signal;
   feedback means, responsive to said propeller speed signal, for providing a predetermined lead compensation to said speed integrator means, said predetermined lead compensation comprising a derivative of said propeller speed signal; and
   control means, responsive to an air speed signal indicative of actual air speed, for inhibiting said feedback means above a predetermined air speed from being provided to said speed integrator means, whereby the value of said predetermined lead compensation is greater than the value which would cause governing instability. above said predetermined air speed.

4. Apparatus according to claim 3 wherein said control means further comprises a hysteresis band through which said air speed signal passes.

5. Apparatus according to claim 3 wherein said control means comprises:
   a switch; and
   switch logic means for actuating said switch above said predetermined air speed.

* * * * *